United States Patent
Kilic et al.

(10) Patent No.: US 10,852,035 B2
(45) Date of Patent: Dec. 1, 2020

(54) HEAT EXCHANGE SYSTEM WITH SIPHON FOR DRAINING A CONDENSATE

(71) Applicants: DAIKIN INDUSTRIES, LTD., Osaka (JP); DAIKIN EUROPE N.V., Ostend (BE)

(72) Inventors: Serhan M Kilic, Hendek (TR); Hakan Peker, Hendek (TR); Abdulkadir Akyol, Hendek (TR)

(73) Assignees: Daikin Industries, Ltd., Osaka (JP); Daikin Europe N.V., Ostend (BE)

( * ) Notice: Subject to any disclaimer, the term of this patent is extended or adjusted under 35 U.S.C. 154(b) by 311 days.

(21) Appl. No.: 15/781,466

(22) PCT Filed: Dec. 6, 2016

(86) PCT No.: PCT/JP2016/086262
§ 371 (c)(1),
(2) Date: Jun. 4, 2018

(87) PCT Pub. No.: WO2017/104492
PCT Pub. Date: Jun. 22, 2017

(65) Prior Publication Data
US 2020/0263901 A1    Aug. 20, 2020

(30) Foreign Application Priority Data
Dec. 14, 2015 (EP) ..................... 15199929

(51) Int. Cl.
*F24H 8/00* (2006.01)
*F28D 21/00* (2006.01)
*F28F 7/02* (2006.01)

(52) U.S. Cl.
CPC ......... *F24H 8/006* (2013.01); *F28D 21/0003* (2013.01); *F28F 7/02* (2013.01); *F28D 2021/0024* (2013.01); *F28F 2255/14* (2013.01)

(58) Field of Classification Search
CPC ................. F24H 8/006; F28D 21/0003; F28D 2021/0024; F28F 7/02; F28F 2255/14
(Continued)

(56) References Cited

U.S. PATENT DOCUMENTS

2012/0090560 A1* 4/2012 Iwama ................... F24H 9/2035
122/14.3

FOREIGN PATENT DOCUMENTS

DE       93 14 195.5 U1    11/1993
DE       9314195 U1 *      11/1993   ............. F24H 8/006
(Continued)

OTHER PUBLICATIONS

International Preliminary Report of corresponding PCT Application No. PCT/JP2015/086262 dated Jun. 28, 2018.
(Continued)

*Primary Examiner* — Steve S Tanenbaum
(74) *Attorney, Agent, or Firm* — Global IP Counselors, LLP

(57) ABSTRACT

A heat exchange system includes a heat exchange main unit having a gas channel and a fluid channel configured such that a fluid in the fluid channel can exchange heat with a flue gas in the gas channel, a housing, a drain collecting part arranged to collect condensate from the flue gas, and a siphon detachably attached to the drain collecting part to prevent release of the flue gas from a condensate outlet formed in the siphon. The siphon has a tubular body, a condensate inlet formed on one end side, and the condensate outlet formed on an other end side. The tubular body has an attaching part to detachably attach the tubular body to the drain collecting part through a hole formed within a wall of the housing, and a grip located outside the housing when the tubular body is attached to the drain collecting part.

20 Claims, 7 Drawing Sheets

(58) Field of Classification Search
USPC .......................................................... 62/291
See application file for complete search history.

(56) References Cited

FOREIGN PATENT DOCUMENTS

| | | |
|---|---|---|
| DE | 93 14 195.5 U1 | 12/1993 |
| EP | 2 853 840 A1 | 9/2014 |
| EP | 2 853 840 A1 | 4/2015 |

OTHER PUBLICATIONS

International Search Report of corresponding PCT Application No. PCT/JP2016/086262 dated May 10, 2017.
European Search Report of corresponding EP Application No. 15 19 9929.9 dated Jun. 8, 2016.
International Preliminary Report of corresponding PCT Application No. PCT/JP2016/086262 dated Jun. 28, 2018.

* cited by examiner

HEAT EXCHANGE SYSTEM WITH SIPHON FOR DRAINING A CONDENSATE

CROSS-REFERENCE TO RELATED APPLICATIONS

This U.S. National stage application claims priority under 35 U.S.C. § 119(a) to European Patent Application No. 15199929.9, filed in Europe on Dec. 14, 2015, the entire contents of which are hereby incorporated herein by reference.

BACKGROUND

Field of the Invention

The invention relates to a heat exchange system in which heat is exchanged between a flue gas and a fluid, specifically a heat exchange system having a siphon for draining a condensate from the flue gas.

Background

Such a heat exchange system is known from EP 2 853 840 A1. The heat exchange system has a heat exchange main unit having a gas channel and a fluid channel configured such that a fluid in the fluid channel exchanges heat with the flue gas in the gas channel. A siphon of the heat exchange system is accommodated in a housing of the heat exchange system. The siphon is attached to a drain collecting part, more specifically a drain outlet of the drain collecting part, in which the condensate from the flue gas is collected, with a union joint. The siphon has a hollow tubular body including a first branch connected to the drain collecting part and a second branch connected to an outlet pipe of the condensate. Due to the presence of the siphon, the condensate from the flue gas is drained without releasing the hot gas from the outlet pipe.

SUMMARY

Inside the siphon, dust contained in the flue gas is accumulated. It is thus necessary to remove the siphon from the drain collecting part for cleaning the inside of the siphon and then to attach the siphon again to the drain collecting part. When the siphon of EP 2 853 840 A1 is removed from and attached to the drain collecting part, it requires to open the housing of the heat exchange system, which needs a lot of maintenance time and an enough work space.

It is the object of the present invention to provide a heat exchange system with siphon for draining a condensate in which the siphon can be removed from and attached to the drain collecting part easily while keeping the structure of the entire system simple and keeping a space for maintenance work small.

A first aspect of the present invention provides a heat exchange system comprising a heat exchange main unit, a housing, a drain collecting part, and a siphon. The heat exchange main unit has a gas channel and a fluid channel configured such that a fluid in the fluid channel can exchange heat with the flue gas in the gas channel in use. The housing accommodates the heat exchange main unit. The drain collecting part is arranged inside the housing and configured to collect condensate from the flue gas. The siphon is detachably attached to the drain collecting part to prevent the release of the flue gas from a condensate outlet formed therein. The siphon has a tubular body. A condensate inlet is formed on one end side of the tubular body and the condensate outlet is formed on the other end side of the tubular body. The tubular body has an attaching part and a grip. The attaching part is arranged on the end side of the tubular body on which the condensate inlet is formed. The attaching part is configured to detachably attach the tubular body to the drain collecting part through a hole formed within a wall of the housing. The grip is arranged on the other end side of the tubular body on which the condensate outlet is formed. The grip is configured to be located outside the housing when the tubular body is attached to the drain collecting part.

With the configuration above, the siphon can be attached to or be removed from the drain collecting part by operating the grip located outside the housing. Thereby the attachment and removing operations can be achieved without opening the housing in which the drain collecting part is accommodated. Accordingly, maintenance of the heat exchange system such as cleaning the siphon is facilitated.

The drain collecting part may be a drain sump or a pipe connected to the drain sump.

According to another aspect of the heat exchange system mentioned above, the attaching part defines the condensate inlet of the siphon.

With the configuration above, when the tubular body is attached to the drain collecting part, it is possible to connect the condensate inlet with the drain collecting part at the same time. Thus, operations for attaching and removing the siphon can be easily achieved even though the drain collecting part is inside the housing and the grip is outside the housing.

According to another aspect of any one of the heat exchange systems mentioned above, at least part of the attaching part has a cylinder-like shape and has a thread. At least part of the drain collecting part has a cylinder-like shape and has a thread corresponding to the thread of the attaching part.

With the configuration above, detachable attachment between the tubular body and the drain collecting part is actualized with a simple structure.

According to another aspect of any one of the heat exchange systems mentioned above, the tubular body of the siphon has a cylinder-like shape.

With the configuration above, the cylinder-like shape facilitates the manufacture of the tubular body with the attaching part which is to be detachably attached to the drain collecting part by a joint structure such as threads.

According to another aspect of any one of the heat exchange systems mentioned above, the tubular body further has a contact member. The contact member is configured to be located outside the housing and contact with an outside surface of the housing, when the tubular body is attached to the drain collecting part.

The contact member may directly or indirectly contact to the housing of the heat exchange system.

With the configuration above, the contact member prevents the tubular body from being excessively inserted into the housing. Accordingly, the grip can stay outside the housing such that an operator can access to the grip and operate the siphon from outside of the housing. Furthermore, the contact member securely keeps the contact between the tubular body and the housing, which prevents the tubular body from vibrating when the heat exchange system is in use.

According to another aspect of any one of the heat exchange systems with the siphon which has the tubular body having the contact member mentioned above, the contact member is integrally formed on the grip.

With the configuration above, the strength of the tubular body is improved and it is easy to manufacture the tubular body at the same time.

According to another aspect of any one of the heat exchange systems mentioned above, a slip prevention structure is formed on a surface of the grip.

With the configuration above, a maintenance person can grasp the grip tightly to attach the tubular body of the siphon to or remove it from the drain collecting part.

It is further preferable if the attaching part and the drain collecting part are configured to be screwed to each other. The slip prevention structure can facilitate to screw the tubular body tightly to the drain collecting part.

According to another aspect of any one of the heat exchange systems with the siphon which has the grip on which the slip prevention structure is formed mentioned above, a groove and/or a projection is formed on the surface of the grip as the slip prevention structure.

With the configuration above, a maintenance person can grasp the grip tightly to attach the tubular body of the siphon to or remove it from the drain collecting part.

According to another aspect of any one of the heat exchange systems mentioned above, the siphon further has a passage portion. The passage portion is configured to be accommodated in the tubular body. The passage portion is configured to be detachably attached to the tubular body.

With the configuration above, it is easy to clean the inside of the passage portion where the condensate is to flow and dust in the condensate is accumulated.

According to another aspect of any one of the heat exchange systems with the siphon having the passage portion mentioned above, the passage portion has a blind-ended tubular shape and forms a passage for the condensate including an outer passage and an inner passage. The outer passage is formed between the outer surface of the passage portion and the inner surface of the tubular body. The inner passage is formed along the inner surface of the passage portion.

An example of a blind-ended tubular shape is a test tube shape. Preferably, the main axis of the passage portion is along the main axis of the tubular body. Further preferably, the passage portion is accommodated in the tubular body in a coaxial manner.

With the configuration above, the passage for the condensate is formed with the passage portion having a relatively simple shape. Since the shape of the passage portion is simple, it is easy to clean the passage portion on which dust tends to be accumulated.

According to another aspect of any one of the heat exchange systems with the siphon having the passage portion which forms the passage for the condensate including the outer passage and the inner passage mentioned above, the tubular body further has a tubular member. The tubular member is configured to be located inside the passage portion and divide the inner passage into a core passage and a middle passage. The core passage is formed by the inner surface of the tubular member. The middle passage is formed between the outer surface of the tubular member and the inner surface of the passage portion.

Preferably, the tubular member is securely mounted on the tubular body.

Preferably, the main axis of the tubular member is along the main axis of the passage portion. Further preferably, the tubular member is accommodated in the passage portion in a coaxial manner.

With the configuration above, the passage for the condensate is formed with a relatively simple configuration. Due to the simple configuration, it is easy to clean the inside of the siphon and to assemble the siphon after cleaning.

According to another aspect of any one of the heat exchange systems with the siphon which has the tubular body having the tubular member mentioned above, the tubular member is configured such that the core passage starts at the condensate inlet formed in the tubular body. The tubular body and the passage portion are configured such that the outer passage ends at the condensate outlet formed in the tubular body.

With the configuration above, a structure to prevent the release of the flue gas from the condensate outlet is realized with a relatively simple configuration. Thus, it is easy to clean the inside of the siphon and to assemble the siphon after cleaning.

According to another aspect of any one of the heat exchange systems with the siphon having the passage portion mentioned above, at least one spacer is arranged between the inner surface of the tubular body and the outer surface of the passage portion.

With the configuration above, the spacer can keep a space between the passage portion and the tubular body to maintain the passage for the condensate.

Preferably, the spacer is configured to fix the passage portion to the tubular body while keeping the passage for the condensate.

According to another aspect of any one of the heat exchange systems mentioned above, the tubular body is configured such that the tubular body which is filled with a liquid can be attached to the drain collecting part.

With the configuration above, after cleaning, the siphon can be filled with a liquid such as water and then be attached to the drain collecting part. Accordingly, there is no need to pour water in the siphon through an entire gas drain passage which opens on the top surface of the housing and is connected to the drain collecting part. Accordingly, time and work can be saved to fill the siphon with a fluid to re-start the whole system after maintenance work.

DETAILED DESCRIPTION OF EMBODIMENT(S)

Preferred embodiments of the heat exchange system according to the present invention will be described with reference to the drawings.

It should be understood that the detailed explanation are provided merely for the purpose of explanation, and are in no way to be construed as limiting of the present invention.

While the present invention will be described with reference to exemplary preferred embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention will be described herein with reference to preferred structures, materials and embodiments, the present invention is not intended to be limited to the particulars disclosed herein; rather, the present invention extends to all functionally equivalent structures, methods and uses, such as are within the scope of the appended claims.

First Embodiment

A first preferred embodiment of the heat exchange system according to the present invention will be described.

Figure 1:
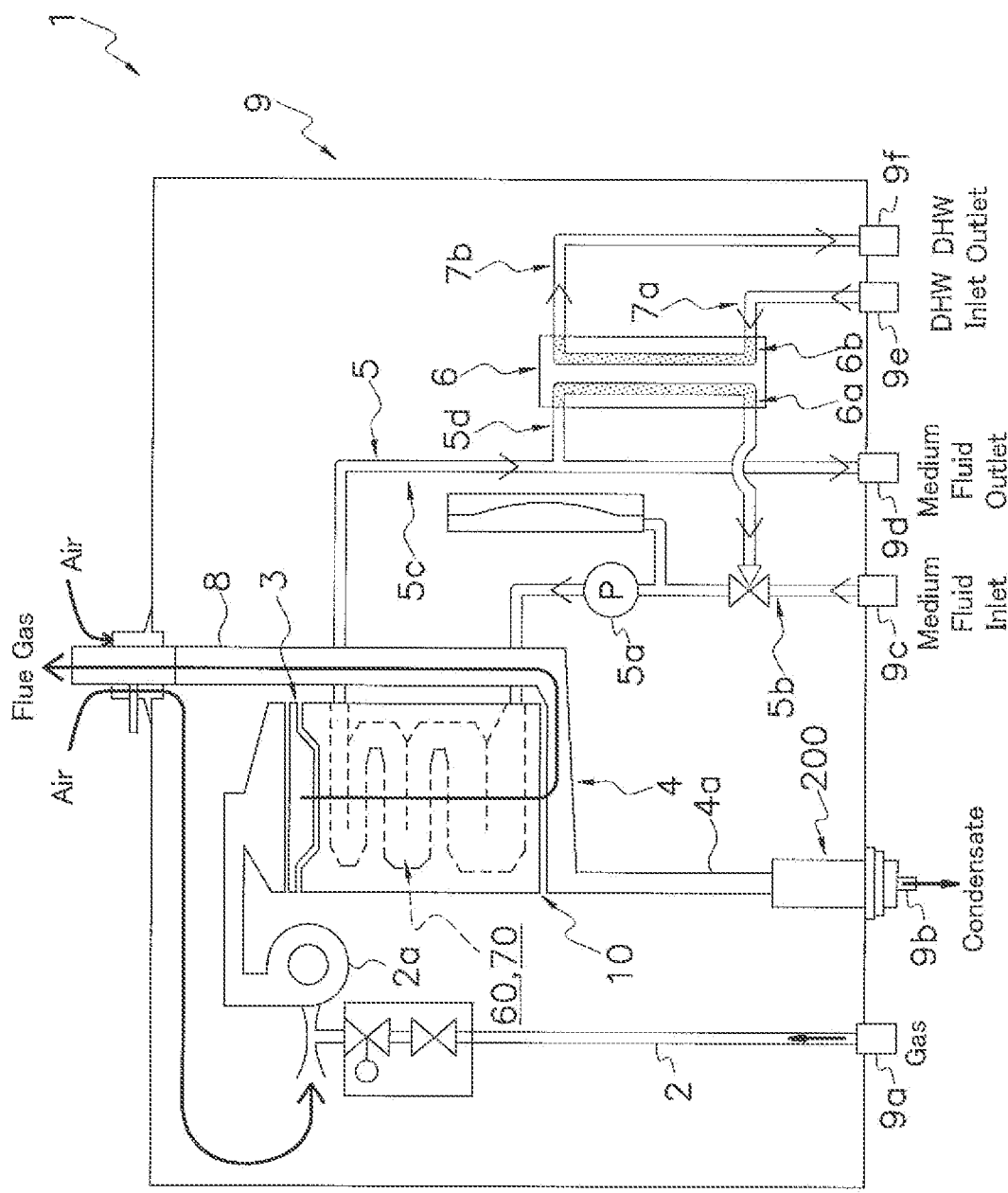
FIG. 1 is a schematic diagram of the heat exchange system according to an embodiment of the present invention.

FIG. 1 shows a schematic diagram of a heat exchange system 1 according to the first preferred embodiment of the present invention.

The heat exchange system 1 is used for heating medium fluid which is used for space heating and heating domestic water. The heat exchange system 1 may be used only for heating the medium fluid for space heating or only for heating the domestic water.

As shown in FIG. 1, the heat exchange system 1 is mainly provided with a heat exchange main unit 10, a fan 2a, a burner 3, a drain collecting part 4, a siphon 200, a pump 5a, a heat exchanger 6, and a housing 9.

In another example, some components of the heat exchange system 1 such as the fan 2a, the pump 5a, and the heat exchanger 6 may be omitted from the heat exchange system 1. Omitted components may be arranged out of the heat exchange system 1 and be configured so as to be functionally connected with the heat exchange system 1.

As shown in FIG. 1, the heat exchange system 1 in the present embodiment has a gas inlet connector 9a to which a fuel gas supply pipe (not shown) is connected. The heat exchange system 1 in the present embodiment has a condensate outlet connector 9b to which a drain outlet pipe (not shown) is connected. The heat exchange system 1 in the present embodiment has medium fluid water inlet/outlet connectors 9c, 9d to which medium fluid inlet/outlet pipes (not shown) are respectively connected. The heat exchange system 1 in the present embodiment has DHW (domestic heat water) inlet/outlet connectors 9e, 9f to which DHW inlet/outlet pipes (not shown) are respectively connected.

The housing 9 shown in FIG. 1 has a box-like-shape such as a cuboid shape, however the shape of the housing 9 is not limited this. The housing 9 accommodates the heat exchange main unit 10, the fan 2a, the burner 3, the drain collecting part 4, the pump 5a, and the heat exchanger 6 as shown in FIG. 1. In another example, some components of the heat exchange system 1, such as the pump 5a and the heat exchanger 6 may be arranged outside the housing 9.

Figure 4:
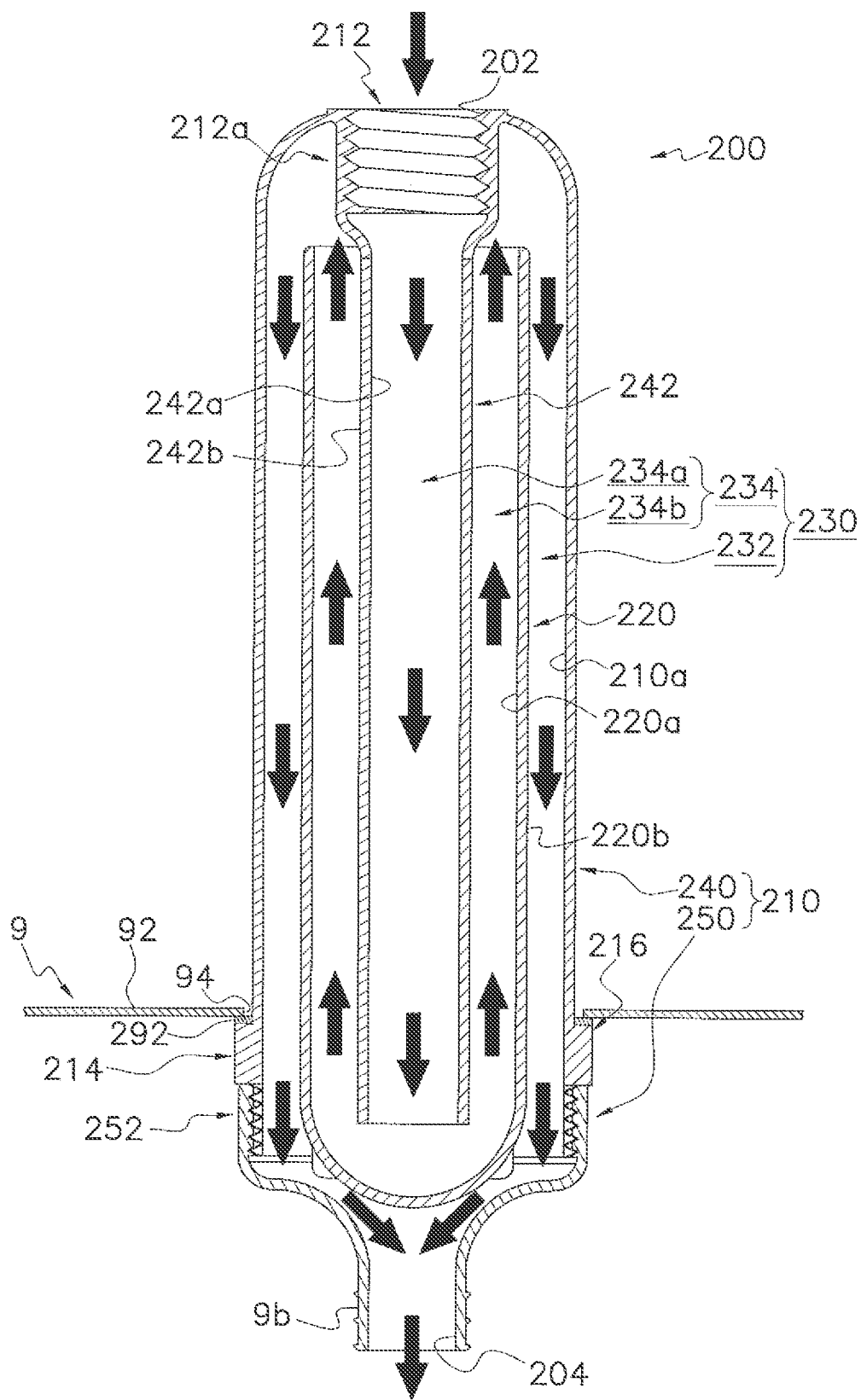
FIG. 4 is a longitudinal cross section view of the siphon of the heat exchange system according to FIG. 1.

A hole 94 is formed within the bottom wall 92 of the housing 9 as shown in FIG. 4. The hole 94 has preferably a circular shape. A tubular body 210 of the siphon 200, which will be explained later, is detachably attached to the drain collecting part 4 through the hole 94 in use. When the tubular body 210 is attached to the drain collecting part 4, the majority of the tubular body 210 of the siphon 200 locates inside housing 9, while a part of the tubular body 210 locates outside the housing 9 as shown in FIG. 4.

The fan 2a intakes a fuel gas such as natural gas which is supplied from the fuel gas supply pipe (not shown) via the gas inlet connector 9a and a gas pipe 2 as shown in FIG. 1. The fan 2a also intakes air from the outside of the housing 9. The fan 2a then supplies the mixture gas with the fuel gas and the air to the burner 3.

Figure 3:
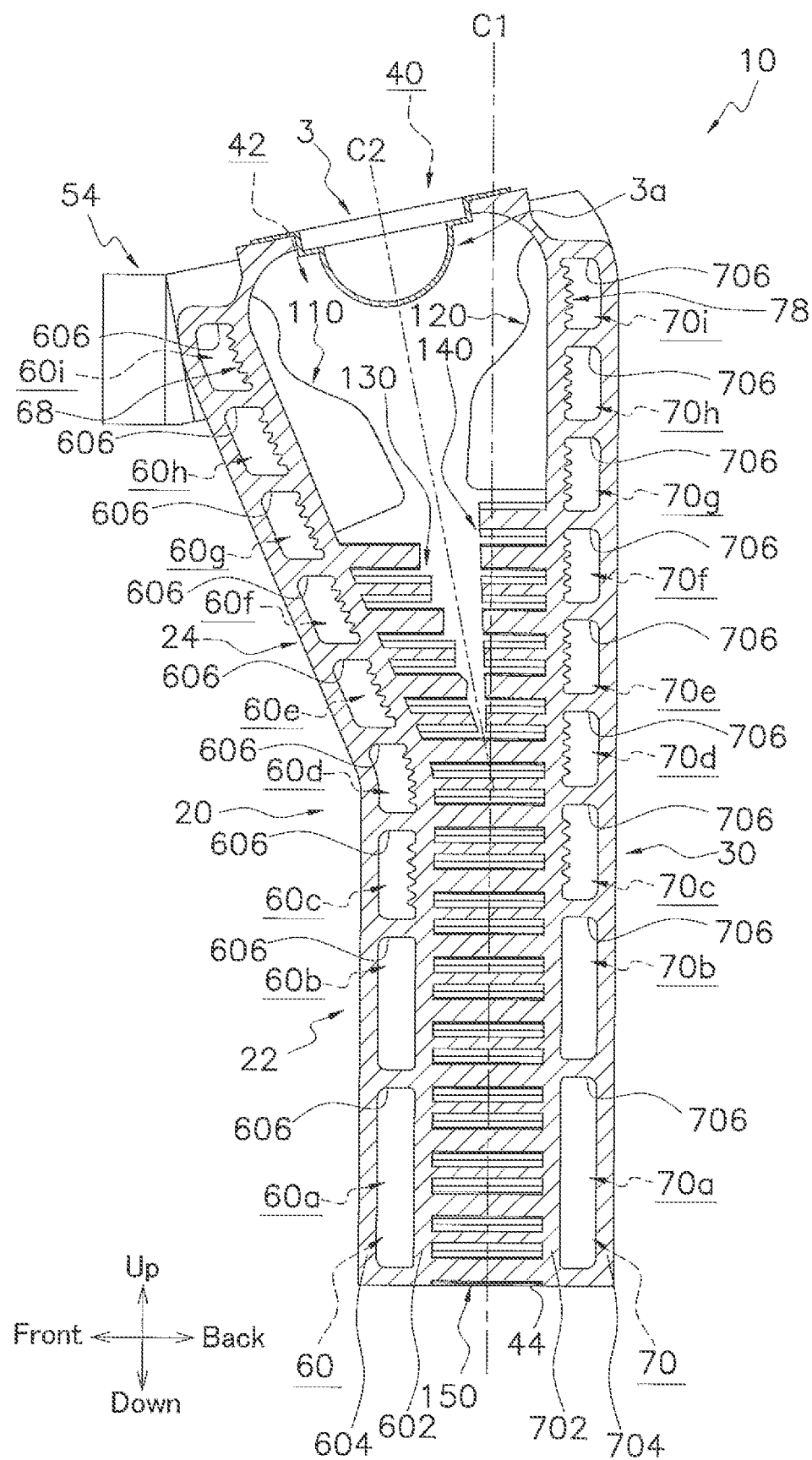
FIG. 3 is a longitudinal cross section view of the heat exchange main unit according to FIG. 2.

The burner 3 is mounted on the heat exchange main unit 10. Specifically, the burner 3 is mounted on the top of the heat exchange main unit 10. A burner port 3a of the burner 3, from which flammable gas is injected, is arranged in a combustion space 42 formed in the heat exchange main unit 10 as shown in FIG. 3. The burner 3 injects the flammable gas (mixture gas with the fuel gas and the air) into the combustion space 42 and combusts the flammable gas in the combustion space 42.

The heat exchange main unit 10 has a flue gas space 40 including the combustion space 42 and two channels 60, 70 as shown in FIG. 3. The heat exchange main unit 10 is configured such that the medium fluid in the two channels 60, 70 can exchange heat with the flue gas flowing in the flue gas space 40, in use.

As mentioned above, the burner port 3a of the burner 3 is arranged over the combustion space 42 and the flammable gas is combusted in the combustion space 42. Flue gas generated by the combustion of the flammable gas flows downward in the flue gas space 40.

The channels 60, 70 constitute a part of a medium fluid circuit 5 in which a medium fluid circulates. The medium fluid circuit 5 further includes an inlet pipe 5b, an outlet pipe 5c, and the medium fluid inlet/outlet pipes (not shown) which are arranged outside the heat exchange system 1 and are connected to the medium fluid water inlet/outlet connectors 9c, 9d. The medium fluid circuit 5 also includes space heating devices (not shown), such as floor heating devices and radiators, which are arranged outside the heat exchange system 1 and which are connected to the medium fluid outlet pipe and the medium fluid inlet pipe. For example, the medium fluid circulating in the medium fluid circuit 5 is an aqueous medium.

In the medium fluid circuit 5, the medium fluid is supplied to the medium fluid inlet connector 9c from the medium fluid inlet pipe (not shown). The medium fluid then flows in each of the channels 60, 70 from the inlet of each of the channels 60, 70 through the inlet pipe 5b. On the inlet pipe 5b, the pump 5a is arranged to circulate the medium fluid in the medium fluid circuit 5. In the heat exchange main unit 10, the medium fluid flows in the channels 60, 70 and exchanges heat with the flue gas flowing in the flue gas space 40. After passing through the channels 60, 70, the medium fluid in each of the channels 60, 70 flows out from the outlet of each of the channels 60, 70. The medium fluid then flows out to the medium fluid outlet pipe (not shown) through the outlet pipe 5c and the medium fluid outlet connector 9d and is sent to space heating devices (not shown) through the medium fluid outlet pipe.

The configuration of the heat exchange main unit 10 will be explained in detail later.

After the flue gas has passed through the flue gas space 40, the flue gas is exhausted out of the housing 9 though a gas duct 8. Condensate from the flue gas is collected at a drain collecting part 4 located below the heat exchange main unit 10. The drain collecting part 4 is arranged inside the housing 9. The drain collecting part 4 includes a drain pipe 4a. The drain pipe 4a has preferably a cylinder-like shape. The siphon 200 is detachably attached to the end portion of the drain pipe 4a. Specifically, at the lower end of the drain pipe 4a, a thread (not shown) is preferably formed on, for example, the outer surface of the drain pipe 4a. The thread formed on the drain pipe 4a corresponds with a thread preferably formed on an attaching part 212 of a tubular body 210 of the siphon 200 described later. By screwing the thread formed on the drain pipe 4a and the corresponding thread formed on the attaching part 212 to each other, the siphon 200 is tightly connected to the drain pipe 4a. The siphon 200 allows the condensate from the flue gas to drain to the drain outlet pipe (not shown) which is connected to the condensate outlet connector 9b while preventing the release of the flue gas.

The configuration of the siphon 200 will be explained in detail later.

The medium fluid circuit 5 includes a connecting pipe 5d which connects the inlet pipe 5b and the outlet pipe 5c of the medium fluid circuit 5 via a medium fluid channel 6a formed in the heat exchanger 6. The connecting pipe 5d is configured so that the medium fluid can flow from the outlet pipe 5c to the inlet pipe 5b through the medium fluid channel 6a.

The heat exchanger 6 has a domestic water channel 6b formed therein. An inlet pipe 7a of the domestic water is connected to an inlet of the domestic water channel 6b. An outlet pipe 7b of the domestic water is connected to an outlet of the domestic water channel 6b. The inlet pipe 7a of the domestic water is connected to DHW inlet connector 9e. The outlet pipe 7b of the domestic water is connected to DHW outlet connector 9f. The inlet/outlet pipes 7a, 7b of the domestic water are configured so that domestic water flows in the domestic water channel 6b from the inlet of the domestic water channel 6b, and flows out to the outlet pipe 7b from the outlet of the domestic water channel 6b after the domestic heat water passes through the domestic water channel 6b. In the heat exchanger 6, domestic heat water flowing in domestic water channel 6b exchanges heat with the medium fluid flowing the medium fluid channel 6a, in use.

The operation of the heat exchange system 1 is briefly explained.

Fuel gas is supplied via the gas inlet connector 9a. Fuel gas and air taken from the outside of the housing 9 are mixed. The mixture gas is supplied to the burner 3. The flammable gas (mixture gas) is injected into the combustion space 42 from the burner 3 and is combusted in the combustion space 42. Flue gas then flows downwardly in the flue gas space 40.

Medium fluid is circulated in the medium fluid circuit 5. During circulation, relatively low temperature medium fluid flows into the channels 60, 70 via medium fluid inlet connector 9c and the inlet pipe 5b. Medium fluid flowing in the channels 60, 70 exchanges heat with the flue gas in the flue gas space 40, in use. The medium fluid heated at the heat exchange main unit 10 flows out from the medium fluid outlet connector 9d through the outlet pipe 5c and is sent to the space heating devices (not shown). The heat of the medium fluid is used for the space heating devices, and cooled medium fluid (the medium fluid taken its heat by the space heating devices) then returns to the heat exchange system 1. By changing the direction of the flowing direction of the medium fluid, the medium fluid heated at the heat exchange main unit 10 is sent to the heat exchanger 6 to heat the domestic water. The heated domestic water is sent to the usage point such as bath room and kitchen.

The flue gas flowing out of the flue gas space 40 is exhausted through the gas duct 8. The condensate from the flue gas is drained to the drain outlet pipe through the siphon 200.

A heat exchange main unit 10 will be described in detail.

Figure 2:
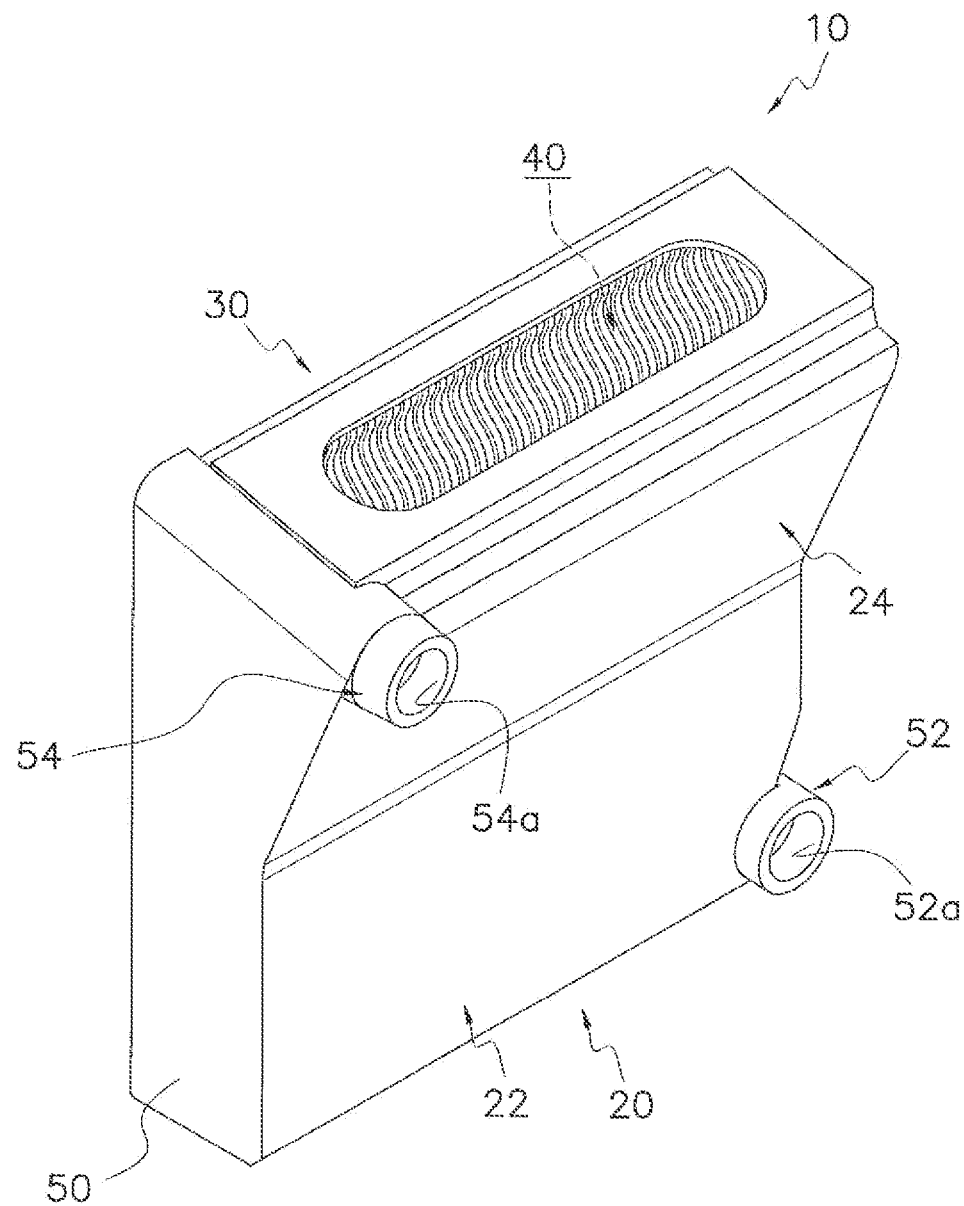
FIG. 2 is a perspective view of the heat exchange main unit of the heat exchange system according to FIG. 1.

FIG. 2 shows a perspective view of the heat exchange main unit 10. FIG. 3 shows a longitudinal cross section view of the heat exchange main unit 10.

The heat exchange main unit 10 is preferably manufactured by corrosion resistant metal such as aluminum alloy. For example, heat exchange main unit 10 is manufactured as monoblock sand-cast, although manufacturing method is not limited to this. The heat exchange main unit 10 is designed so that the burner 3 is mounted on the top of the heat exchange main unit 10 as shown in FIG. 1. The heat exchange main unit 10 mainly includes a front wall 20, a back wall 30, side walls 50, an inlet distribution pipe 52, and an outlet converging pipe 54 as shown in FIG. 2.

The front wall 20 and the back wall 30 form a flue gas space 40 for a flue gas. The flue gas space 40 is formed by a space defined by the front wall 20, the back wall 30 and the side walls 50 which are attached to lateral ends of the front wall 20 and the back wall 30. The flue gas space 40 includes the combustion space 42 of the flammable gas. The combustion space 42, in which the burner port 3a of the burner 3 is installed, is arranged at the upper part of the flue gas space 40 as shown in FIG. 3. The flue gas flows downwardly in the flue gas space 40 from the combustion space 42 and flows out from an opening 44 arranged at the bottom of the heat exchange main unit 10, in use.

The back wall 30 has a tabular shape. The heat exchange main unit 10 is arranged on a horizontal plane and the back wall 30 extends along a vertical plane as shown in FIG. 3, although the arrangement of the heat exchange main unit 10 is not limited to this.

The front wall 20 includes a lower portion 22 and an upper portion 24 as shown in FIG. 2. The lower portion 22 extends upwardly along the back wall 30 as shown in FIG. 3. In other word, the lower portion 22 of the front wall extends in parallel with the back wall 30. The lower portion 22 preferably has a plane-like shape. The upper portion 24 extends upwardly from the upper end of the lower portion 22 as shown in FIG. 3. More specifically, the upper portion 24 extends upwardly from the upper end of the lower portion 22 in a planar fashion. Furthermore, the upper portion 24 extends outwardly away from the back wall 30 so as to form a combustion space 42 of a flammable gas between the upper portion 24 of the front wall 20 and the back wall 30.

The space formed under the upper portion 24 is effectively used for arranging elements of the heat exchange system 1 such as the fan 2a to achieve the downsizing of the housing 9 of the heat exchange system 1. The space formed under the upper portion 24 may also be used for arranging the other elements of the heat exchange system 1 such as valve, pipe, and venturi device.

Next, the structures which are arranged on the inner surface of the front wall 20 and the inner surface of the back wall 30 will be described with reference to FIG. 3. The inner surface of the upper portion 24 is a surface which faces the back wall 30. The inner surface of the back wall 30 is a surface which faces the front wall 20.

The upper portion 24 of the front wall 20 is provided with front fins 110 as shown in FIG. 3. The front fins 110 are formed to protrude from the inner surface of the front wall 20. A plurality of the front fins 110 is arranged along the lateral direction (left-right direction) of the front wall 20 on the inner surface of the upper portion 24 at a predetermined interval. The number of the front fins 110 and the interval between the front fins 110 depend on the various factors such as the amount of heat transferred from the flue gas to the medium fluid, materials of the walls, and the power of the burner to be installed.

In addition to the front fins 110, the front wall 20 is provided with front pins 130, 150 as shown in FIG. 3. The front pins 130, 150 are arranged on the downstream side of the front fins 110 with respect to the flue gas flow direction. In other words, the front pins 130, 150 are arranged below the front fins 110. The cross-sectional of the front pins 130, 150 with respect to its main axis has a circular shape, or preferably an elliptic shape which is longer in the longitudinal direction than the lateral direction of the front wall. Each of the pins 130, 150 has larger surface area per unit volume than the front fins 110. The front pins 130, 150 extend backwardly from the inner surface of the front wall 20. A part of the front pins (pins 130) is arranged at the upper portion 24 of the front wall 20 below the front fins 110. A plurality of the front pins 130 is preferably arranged along the lateral direction (left-right direction) of the front wall 20 on the inner surface of the upper portion 24 at a predetermined interval. Several lines of the front pins 130 are preferably arranged at the upper portion 24 along the longitudinal direction at a predetermined interval. The rest of the front pins 150 are arranged at the lower portion 22 of the front wall. A plurality of the front pins 150 is arranged along the lateral direction (left-right direction) of the front wall 20 on the inner surface of the lower portion 22 at a predetermined interval. Several lines of the front pins 150 are arranged at the lower portion 22 along the longitudinal direction at a predetermined interval. The number of the front pins 130, 150, and the interval between the front pins 130, 150 depend on the various factors such as the amount of heat transferred from the flue gas to the medium fluid, materials of the walls, and the power of the burner to be installed.

The back wall 30 is provided with back fins 120 as shown in FIG. 3. The back fins 120 are formed to protrude from the inner surface of the back wall 30. A plurality of the back fins 120 is arranged along the lateral direction (left-right direction) of the back wall 30 on the inner surface of the back wall 30 at a predetermined interval. The number of the back fins 120 and the interval between the back fins 120 depend on the various factors such as the amount of heat transferred from the flue gas to the medium fluid, materials of the walls, and the power of the burner to be installed.

The number of the back fins 120 and the interval between the back fins 120 are preferably the same as those of the front fins 110. Each of the back fins 120 preferably corresponds to one of the front fins 110 such that the corresponding front and back fins face to each other. The front fin 110 and the corresponding back fin 120 are arranged symmetrically with respect to a virtual line C2 along which the flammable gas is to be injected into the combustion space 42 as shown in FIG. 3.

In addition to the back fins 120, the back wall 30 is provided with back pins 140, 150 as shown in FIG. 3. The cross-sectional of the back pins 140, 150 with respect to its main axis has a circular shape, or preferably an elliptic shape which is longer in the longitudinal direction than the lateral direction of the back wall 30. Each of the pins 140, 150 has larger surface area per unit volume than the back fins 120. The back pins 140, 150 extend forwardly from the inner surface of the back wall 30. A plurality of the back pins 140, 150 is arranged in the lateral direction (left-right direction) of the back wall 30 on the inner surface of the back wall 30 at a predetermined interval. Several lines of the back pins 140, 150 are arranged on the back wall 30 along the longitudinal direction at a predetermined interval. The number of the back pins 140, 150 and the interval between the back pins 140, 150 depend on the various factors such as the amount of heat transferred from the flue gas to the medium fluid, materials of the walls, and the power of the burner to be installed.

The front pins 150 arranged at the lower portion 22 of the front wall 20 are preferably connected to the corresponding back pins 150. In this embodiment, each of the pins 150 extends from the front wall 20 to the back wall 30. In other words, front pins 150 arranged at the lower portion 22 of the front wall 20 are integrated with the back pins 150.

The front pins 130 arranged at the upper portion 24 of the front wall 20 so as to face to the corresponding back pins 140. In other words, the front pins 130 are arranged at the upper portion 24 of the front wall 20 is not connected to the corresponding back pins 140 so as to make a space between them.

As explained above, the upper portion of the front wall 20 and the corresponding part of the back wall 30, which forms the combustion space 42 of heat exchange main unit 10 therebetween, is designed symmetrically with respect to the virtual line C2 which tilts against a virtual line C1. The lower portion 22 of the front wall 20 and the back wall 30 is arranged symmetrical with respect to the virtual line C1. With this configuration, flammable gas can be combusted under proper condition and the concentration of CO and NOx contained in the emission gas can be lowered.

A front channel 60 is formed in the front wall 20 and a back channel 70 is formed in the back wall 30 as shown in FIG. 3. The medium fluid flows in the front channel 60 and back channel 70, in use.

The inlet distribution pipe 52 has a tube-shape which has an inlet opening 52a in the front side as shown in FIG. 3. The inlet pipe 5b of the medium fluid circuit 5 is connected at the inlet opening 52a. The inlet distribution pipe 52 is also connected to the inlets of each of the front channel 60 and the back channel 70. The inlet distribution pipe 52 is configured to distribute the fluid to the front channel 60 and the back channel 70, in use. The medium fluid flows into the front channel 60 and the back channel 70 through the inlet distribution pipe 52, in use.

The outlet converging pipe 54 has a tube-shape which has an outlet opening 54a in the front side as shown in FIG. 3. The outlet pipe 5c of the medium fluid circuit 5 is connected at the outlet opening 54a. The outlet converging pipe 54 is also connected to the outlets of each of the front channel 60 and the back channel 70. The outlet converging pipe 54 is configured to converge the fluid from the front channel 60 and the back channel 70, and output therefrom, in use. The converged medium fluid flows in the outlet pipe 5c of the medium fluid circuit 5, in use.

The front wall 20 has an inside wall 602 and an outside wall 604 which face to each other and form the front channel 60 therebetween. The front wall 20 also has wall elements 606 which connect the inside wall 602 and the outside wall 604 and define the front channel 60. The back wall 30 has an inside wall 702 and an outside wall 704 which face to each other and form the back channel 70 therebetween. The back wall 30 has wall elements 706 which connect the inside wall 702 and outside wall 704 and define the back channel 70.

The front channel 60 includes straight portions 60a, 60b, 60c, 60d, 60e, 60f, 60g, 60h, and 60i which are arranged in substantially parallel to each other and are connected in series as shown in FIG. 8. The medium fluid supplied from the inlet of the front channel 60 flows the straight portions 60a, 60b, 60c, 60d, 60e, 60f, 60g, 60h, and 60i in this order and flows out from the outlet of the front channel 60.

A plurality of pins (not shown) extending from the inside wall 602 is arranged in the straight portions 60a, 60b so as to improve the heat transfer efficiency between the medium fluid flowing in the straight portions 60a, 60b and the flue gas which flows along the inside wall 602. In the straight portions 60c-60i, a plurality of grooves 68 extending along the longitudinal direction of the straight portions 60c-60i is formed on the inside wall 602. Thereby the heat transfer area is increased between the medium fluid flowing in the straight portions 60c-60i and the flue gas which flows along the inside wall 602.

Preferably, the cross-sectional area of the straight portion 60a arranged on the most upstream side is larger than the cross-sectional area of the other straight portions 60b-60i arranged on downstream side with respect to the fluid flow as shown in FIG. 3.

The back channel 70 also includes straight portions 70a, 70b, 70c, 70d, 70e, 70f, 70g, 70h, and 70i as shown in FIG. 3. The straight portions 70a-70i are arranged in substantially parallel to each other and are connected in series. The medium fluid flowing from the inlet of the back channel 70 flows the straight portions 70a, 70b, 70c, 70d, 70e, 70f, 70g, 70h, and 70i in this order and flows out from the outlet of the back channel 70. In a manner similar to the above, a plurality of pins (not shown) extending from the inside wall 702 is arranged in the straight portions 70a, 70b and a plurality of grooves 78 extending along the longitudinal direction of the straight portions 70c-70i are formed on the inside wall 702 in the straight portions 70c-70i. The cross-sectional area of the straight portion 70a arranged on the most upstream side is larger than the cross-sectional area of the other straight portions 70b-70i arranged on downstream side with respect to the fluid flow.

Figure 5:
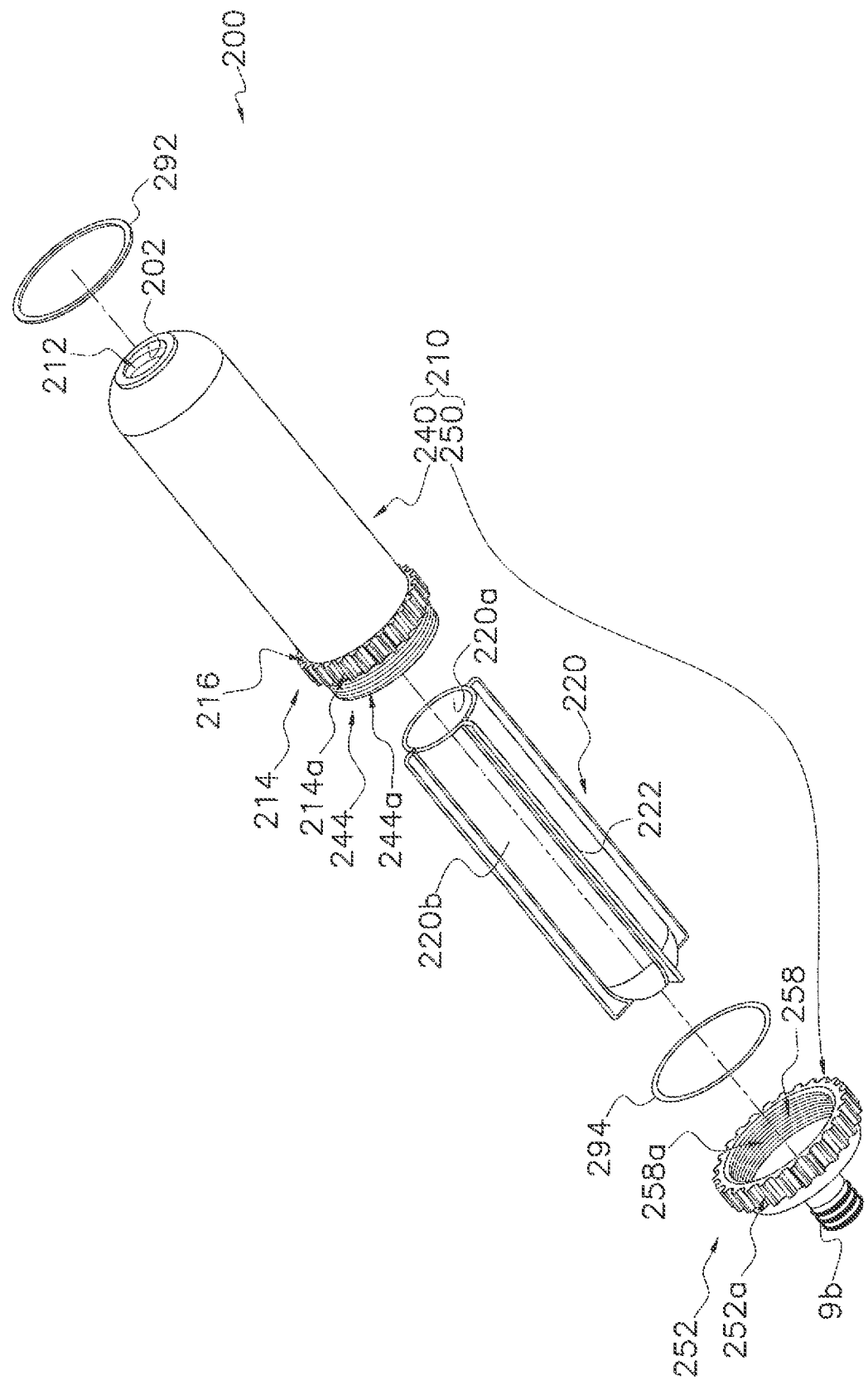
FIG. 5 is an exploded view of the siphon according to FIG. 4.

A siphon 200 according to the first preferred embodiment will be described in detail in reference to the FIG. 4 and FIG. 5. FIG. 4 shows a longitudinal cross section view of the siphon 200. FIG. 5 shows an exploded view of the siphon 200.

The siphon 200 is detachably attached to the drain pipe 4a of the drain collecting part 4. The siphon 200 prevents the release of the flue gas from a condensate outlet 204 formed therein.

The siphon 200 mainly has a tubular body 210 and a passage portion 220 as shown in FIG. 4.

The tubular body 210 preferably has a cylinder-like shape, however the shape of the tubular body 210 is not limited to this. For example, the tubular body 210 may have a square tube shape.

The tubular body 210 is preferably arranged so as to extend along a substantially vertical direction in use, although the arrangement of the tubular body 210 is not limited to this. The passage portion 220 has a blind-ended tubular shape. For example, the passage portion 220 is formed in a test tube shape.

The tubular body 210 has a first portion 240 and a second portion 250 as shown in FIG. 4. The first portion 240 has a blind-ended tubular shape. For example, the first portion 240 is formed in a test tube shape, however the shape of the first portion 240 is not limited to this. The first portion 240 is detachably attached to the drain collecting part 4. The second portion 250 is detachably attached to the first portion 240. The second portion 250 attached to the first portion 240 closes the open end of the first portion 240. The first portion 240 and the second portion 250 constitute the tubular body 210 and define a space to accommodate the passage portion 220 in the tubular body 210.

The tubular body 210 is configured such that, when the tubular body 210 is attached to the drain collecting part 4, the first portion 240 is connected to the drain collecting part 4 and is at least partially located inside the housing 9, and the second portion 250 is at least partially located outside the housing 9. Specifically, most of the first portion 240 except for a grip 214 and a connecting part 244, which will be described later, is located inside the housing 9 when the tubular body 210 is attached to the drain collecting part 4 as shown in FIG. 4 and FIG. 5. The whole second portion 250 locates outside the housing 9 when the tubular body 210 is attached to the drain collecting part 4 as shown in FIG. 4.

A condensate inlet 202 is formed on one end portion of the tubular body 210 and a condensate outlet 204 is formed on the other end portion of the tubular body 210. Specifically, the condensate inlet 202 is formed at an end portion of the tubular body 210 to be connected with the drain collecting part 4. Accordingly, the condensate inlet 202 is formed in the first portion 240. The condensate outlet 204 is formed at the other end portion of the tubular body 210. Accordingly, the condensate outlet 204 is formed in the second portion 250. The second portion 250 has the condensate outlet connector 9b to which the drain outlet pipe (not shown) is connected. The condensate from the drain collecting part 4 flows into the siphon 200 from the condensate inlet 202 and flows out to the drain outlet pipe (not shown) through the condensate outlet 204.

The tubular body 210 has an attaching part 212. The attaching part 212 is arranged on the first portion 240 of the tubular body 210. The attaching part 212 is preferably arranged at the end of the tubular body 210 on the side of the condensate inlet 202. In the present embodiment, the attaching part 212 defines the condensate inlet 202 of the siphon 200.

The attaching part 212 is configured to detachably attach the tubular body 210 to the drain collecting part 4. The portion of the first portion 240 which locates inside the housing 9 has nearly the same as or smaller diameter than the hole 94. Preferably, the hole 94 has a little greater diameter than the maximum diameter of the first portion 240 which locates inside the housing 9 when the tubular body 210 is attached to the drain collecting part 4. The attaching part 212 has a cylinder-like shape portion 212a having a thread formed as an outer thread or inner thread. The thread formed on the inner or outer surface of the cylinder-like shape portion 212a corresponds with the thread (not shown) formed on the outer or inner surface of the drain pipe 4a. The attaching part 212 is configured to detachably attach the tubular body 210 to the drain collecting part 4 by the thread coupling between the thread on the attaching part 212 and the thread on the drain pipe 4a of the drain collecting part 4.

The tubular body 210 has a grip 214. The grip 214 is configured to be grasped by a maintenance person who attaches the siphon 200 to or removes it from the drain collecting part 4.

The grip 214 is arranged on the outer surface of the tubular body 210. The grip 214 is preferably arranged at the end portion of the first portion 240 opposite to the condensate inlet 202. In other words, the grip 214 is preferably formed at the end portion of the first portion 240 to be attached to the second portion 250. The grip 214 is located outside the housing 9 when the tubular body 210 is attached to the drain collecting part 4.

The grip 214 has preferably a ring shape. The grip 214 is formed so as to protrude outwardly from the outer surface of the first portion 240. A slip prevention structure 214a is preferably formed on the outer surface of the grip 214 as shown in FIG. 5. A groove and/or a projection is preferably formed on the outer surface of the grip 214 as the slip prevention structure 214a. A maintenance person can grasp the grip 214 tightly when he screws the tubular body 210 of the siphon 200 to attach to or remove from the drain collecting part 4.

The tubular body 210 preferably has a contact member 216. The contact member 216 is configured to be located outside the housing 9 and contact with an outside surface of the housing 9 when the tubular body 210 is attached to the drain collecting part 4. Specifically, the contact member 216 is configured to contact with an outside surface of the bottom wall 92 of the housing 9 via a gasket 292 as shown in FIG. 4.

Preferably, the contact member 216 is integrally formed on the grip 214. Specifically, the grip 214 is formed in a ring shape which has a greater diameter than the hole 94 formed within the bottom wall 92 of the housing. The upper surface of the grip 214, i.e. the contact member 216 is configured to contact with an outside surface of the bottom wall 92 of the housing 9 via the gasket 292.

The passage portion 220 is configured to be accommodated in the tubular body 210 and be detachably attached to the tubular body 210.

The passage portion 220 is configured to form a passage 230 for the condensate as shown in FIG. 4. The passage 230 includes an outer passage 232 and an inner passage 234 as shown in FIG. 4. The outer passage 232 is formed between the outer surface 220b of the passage portion 220 and the inner surface 210a of the tubular body 210. The inner passage 234 is formed along the inner surface 220a of the passage portion 220.

The first portion 240 preferably includes a tubular member 242. The tubular member 242 is configured to be located inside the passage portion 220. The tubular member 242 is configured to divide the inner passage 234 into a core passage 234a and a middle passage 234b. The core passage 234a is formed by the inner surface 242a of the tubular member 242. The middle passage 234b is formed between the outer surface 242b of the tubular member 242 and the inner surface 220a of the passage portion 220.

The tubular member 242 is configured such that the core passage 234a starts at the condensate inlet 202 on the first portion 240. The tubular body 210 and the passage portion 220 are configured such that the outer passage 232 ends at the condensate outlet 204 of the second portion 250. Accordingly, the condensate is guided downwardly through the core passage 234a, upwardly through the middle passage 234b, and downwardly through the outer passage 232 to the condensate outlet 204. The condensate flows through the core passage 234a, middle passage 234b, and the outer passage 232 in this order. Since the condensate with the higher temperature flows in the inner passage 234 and therefore the hot water does not come out from the siphon 200 easily even if the outside surface of the tubular body 210 is broken for some reasons. Thus, safety of the siphon 200 can be enhanced.

At least one spacer 222 is preferably arranged between the inner surface 210a of the tubular body 210 and the outer surface 220b of the passage portion 220. In this embodiment, four spacers 222 are arranged between the inner surface 210a of the tubular body 210 and the outer surface 220b of the passage portion 220 as shown in FIG. 5, although the number of the spacers 222 is not limited to this. Due to the presence of the spacers 222, the outer passage 232 is secured.

The spacers 222 are preferably arranged on the outer surface 220b of the passage portion 220. The spacers 222 outwardly protrude from the outer surface 220b of the passage portion 220. The spacers 222 are arranged between the inner surface of the second portion 250 and the outer surface 220b of the passage portion 220. Further preferably, the spacers 222 are arranged between the inner surface of the first portion 240 and the outer surface 220b of the passage portion 220. Each of the spacers 222 preferably extends from one end of the passage portion 220 to the other end of the passage portion 220 as shown in FIG. 5. However, each of the spacers 222 may be separated into several spacers as long as an enough passage for the condensate can be maintained. Part of the several spacers is arranged between the inner surface of the second portion 250 and the corresponding outer surface 220b of the passage portion 220. Another part of the several spacers is arranged between the inner surface of the first portion 240 and the corresponding outer surface 220b of the passage portion 220.

The second portion 250 is configured to be detachably attached to the first portion 240. Specifically, a connecting part 244, which has preferably an outer thread 244a on its external surface, is arranged in the first portion 240 at the end portion connectable with the second portion 250 as shown in FIG. 5. A connecting part 258, which has preferably an inner thread 258a on its internal surface, is arranged on the second portion 250 at the end portion connectable with the first portion 240. The outer thread 244a on the connecting part 244 corresponds to the inner thread 258a on the connecting part 258. The second portion 250 is configured to be detachably attached to the first portion 240 by coupling the outer thread 244a on the connecting part 244 to the inner thread 258a on the connecting part 258. An O-ring seal 294 is preferably arranged at the coupling portion of the first portion 240 and the second portion 250.

When the second portion 250 is attached to the first portion 240, the passage portion 220 is supported by the second portion 250. Specifically, the spacers 222 arranged on the outer surface 220b of the passage portion 220 are supported by the second portion 250. Therefore, the passage portion 220 can be removed from the tubular body 210 by removing the second portion 250 from the first portion 240.

The second portion 250 has an operating member 252 to facilitate the attachment of the second portion 250 to or removal of it from the first portion 240. The operating member 252 is another grip different from the grip 214. The operating member 252 is configured to be grasped by a maintenance person when he attaches the second portion 250 to or removed it from the first portion 240.

The operating member 252 is arranged on the outside surface of the second portion 250. The operating member 252 locates outside the housing 9 when the tubular body 210 is attached to the drain collecting part 4.

The operating member 252 preferably has a ring shape. Further preferably, a slip prevention structure 252a is formed on the outside surface of the operating member 252 as shown in FIG. 5. A groove and/or a projection is an example of the slip prevention structure 252a. A maintenance person can grasp the operating member 252 tightly when he rotates the second portion 250 to attach to or remove from the first portion 240.

Now, the maintenance of the siphon 200 is explained below.

When the maintenance of the siphon 200, such as the cleaning or the replacement of the siphon 200, is necessary, the siphon 200 is removed from the drain collecting part 4 and/or the second portion 250 is removed from the first portion 240.

In a case the siphon 200 is removed from the drain collecting part 4, a maintenance person grasps the grip 214 and rotates the tubular body 210 of the siphon 200 for releasing coupling between the thread on the attaching part 212 and the thread on the drain pipe 4a of the drain collecting part 4. After removing the siphon 200 from the drain collecting part 4, the second portion 250 may be removed from the first portion 240, if necessary.

In a case the second portion 250 is removed from the first portion 240, a maintenance person grasps the operating member 252 and rotates the second portion 250 for releasing coupling between the outer thread 244a on the connecting part 244 of the first portion 240 and the inner thread 258a on the connecting part 258 of the second portion 250. When the second portion 250 is removed from the first portion 240, the passage portion 220 supported by the second portion 250 is removed from the tubular body 210. After removing the second portion 250 from the drain collecting part 4, the first portion 240 may be removed from the drain collecting part 4, if necessary.

In a case that the tubular body 210 including the first and second portions 240, 250 is attached to the drain collecting part 4 after maintenance of the siphon 200, the tubular body 210, especially the blind-ended passage portion 220 is preferably filled with a liquid such as water. The siphon 200 needs to be filled with the liquid to prevent the release of the flue gas from the condensate outlet 204. By filling the liquid in the tubular body 210 before attaching the tubular body 210 to the drain collecting part 4, there is no need to pour water in the siphon 200 through the entire gas passage connected to the drain collecting part 4 from the top thereof.

In a case that the second portion 250 is attached to the first portion 240 which is attached to the drain collecting part 4, the blind-ended passage portion 220 is preferably filled with a liquid such as water for the same reason as mentioned above.

Second Embodiment

Another preferred embodiment of the heat exchange system according to the present invention will be described. In this embodiment, the configuration except for the siphon is the same as the first embodiment mentioned above. A siphon 300 of this embodiment will be described in detail in reference to the figures and the explanation of the other elements of the heat exchange system will be omitted.

Figure 6:
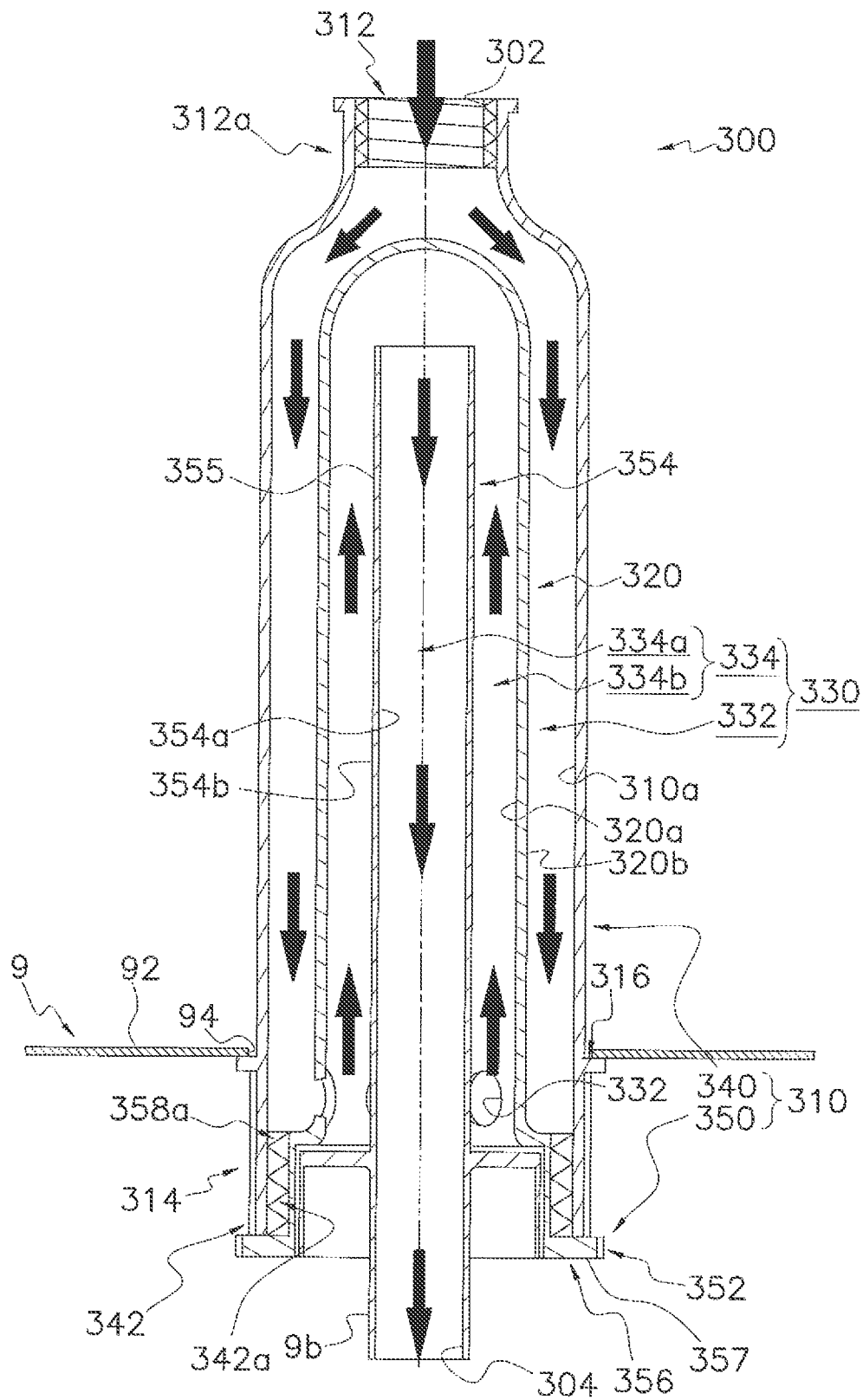
FIG. 6 is a longitudinal cross section view of the siphon of the heat exchange system according to another embodiment of the present invention.
Figure 7:
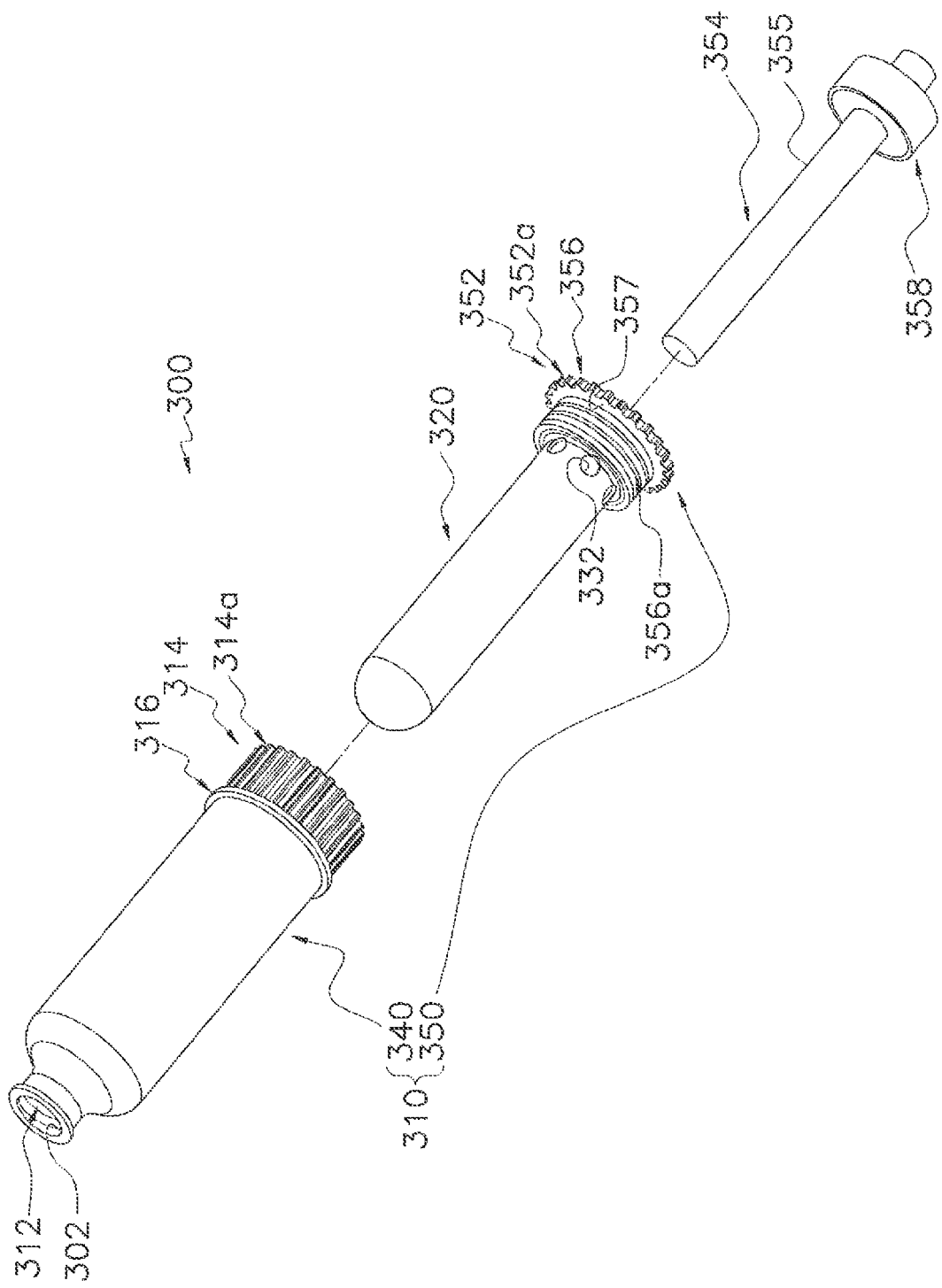
FIG. 7 is an exploded view of the siphon according to FIG. 6.

FIG. 6 shows a longitudinal cross section view of the siphon 300. FIG. 7 shows an exploded view of the siphon 300.

The siphon 300 is detachably attached to the drain pipe 4a of the drain collecting part 4. The siphon 300 prevents the release of the flue gas from a condensate outlet 304 formed therein.

The siphon 300 mainly has a tubular body 310 and a passage portion 320 as shown in FIG. 6.

The tubular body 310 preferably has a cylinder-like shape, however the shape of the tubular body 310 is not limited to this. For example, the tubular body 310 may have a square tube shape.

The tubular body 310 is preferably arranged so as to extend along a substantially vertical direction in use, although the arrangement of the tubular body 310 is not limited to this. The passage portion 320 has preferably a blind-ended tubular shape. For example, the passage portion 320 is formed in a test tube shape.

The tubular body 310 has a first portion 340 and a second portion 350 as shown in FIG. 6. The first portion 340 has a blind-ended tubular shape. For example, the first portion 340 is formed in a test tube shape. The second portion 350 is detachably attached to the first portion 340. The second portion 350 attached to the first portion 340 closes the open end of the first portion 340. The first portion 340 and the second portion 350 constitute the tubular body 310 and define a space to accommodate the passage portion 320 in the tubular body 310.

The tubular body 310 is configured such that, when the tubular body 310 is attached to the drain collecting part 4, the first portion 340 is connected to the drain collecting part 4 and is at least partially located inside the housing 9, and the second portion 350 is at least partially located outside the housing 9. Specifically, most of the first portion 340 except for a grip 314 and a contact member 316, which will be described later, is located inside the housing 9 when the tubular body 310 is attached to the drain collecting part 4 as shown in FIG. 6. At least an operating member 352 arranged on the second portion 350, which will be described later, is located outside the housing 9 when the tubular body 310 is attached to the drain collecting part 4 as shown in FIG. 6.

A condensate inlet 302 is formed on one end portion of the tubular body 310 and a condensate outlet 304 is formed on the other end portion of the tubular body 310. The details of the condensate inlet 302 and the condensate outlet 304 can be referred to the condensate inlet 202 and the condensate outlet 204 in the first embodiment.

The tubular body 310 has an attaching part 312. The attaching part 312 is arranged on the first portion 340 of the tubular body 310. The attaching part 312 is preferably arranged at the end portion of the tubular body 310 to be connected with the drain collecting part 4. In the present embodiment, the attaching part 312 defines the condensate inlet 302 of the siphon 300. The relation between the attaching part 312 and the hole 94 formed within the bottom wall 92 of the housing 9 can be referred to in the first embodiment. The details of the attaching part 312 including the threads formed on the inner surface of the cylinder-like shape portion 312a and the outer surface of the drain pipe 4a can be referred to in the first embodiment.

The tubular body 310 has a grip 314. The grip 314 is configured to be grasped by a maintenance person who attaches the siphon 300 to or removes it from the drain collecting part 4.

The grip 314 is arranged on the outer surface of the tubular body 310. The grip 314 is preferably arranged at the end portion of the tubular body 310 on the side of the condensate outlet 304. The grip 314 is preferably arranged in the first portion 340 at the end portion opposite to the condensate inlet 302. In other words, the grip 314 is preferably formed at the end portion of the first portion 340 to be attached to the second portion 350. The grip 314 is located outside the housing 9 when the tubular body 310 is attached to the drain collecting part 4.

The grip 314 has preferably a ring shape. A slip prevention structure 314a is preferably formed on a surface of the grip 314 as shown in FIG. 7. A groove and/or a projection is preferably formed on the outer surface of the grip 314 as the slip prevention structure 314a. A maintenance person can grasp the grip 314 tightly when he screws the tubular body 310 of the siphon 300 to attach to or remove from the drain collecting part 4.

The tubular body 310 has a contact member 316 which contacts with an outside surface of the housing 9 as shown in FIG. 6, when the tubular body 310 is attached to the drain collecting part 4. The contact member 316 is formed so as to protrude outwardly from a part of the first portion 340. The contact member 316 has preferably a ring shape whose diameter is greater than the diameter of the hole 94 within the bottom wall 92 of the housing 9. Preferably, the contact member 316 is arranged on the condensate inlet 302 side with respect to the grip 314 to keep the grip 314 outside the housing 9 when the tubular body 310 is attached to the drain collecting part 4.

The passage portion 320 is configured to be accommodated in the tubular body 310 and be detachably attached to the tubular body 310. In the present embodiment, the passage portion 320 is configured to be detachably engaged with the first portion 340 by threads.

The passage portion 320 is configured to form a passage 330 for the condensate as shown in FIG. 6. The passage 330 includes an outer passage 332 and an inner passage 334 as shown in FIG. 6. The outer passage 332 is formed between the outer surface 320b of the passage portion 320 and the inner surface 310a of the tubular body 310. The inner passage 334 is formed along the inner surface 320a of the passage portion 320. The inner passage 334 includes a core passage 334a and a middle passage 334b.

The second portion 350 of the tubular body 310 preferably includes a tubular member 354. The tubular member 354 is configured to be partially located inside the passage portion 320. The tubular member 354 is configured to divide the inner passage 334 into a core passage 334a and a middle passage 334b. The core passage 334a is formed by the inner surface 354a of the tubular member 354. The middle passage 334b is formed between the outer surface 354b of the tubular member 354 and the inner surface 320a of the passage portion 320.

The second portion 350 of the tubular body 310 has a support part 356 to which the tubular member 354 is detachably attached and by which the tubular member 354 is configured to be supported. In the present embodiment, the tubular member 354 has a tubular body 355 and a connecting part 358 which has a cylindrical shape and has a diameter to close the open end of the passage portion 320. The support part 356 of the second portion 350 has a cylindrical shape corresponding to the shape of the connecting part 358 so as to receive and support the connecting part 358. Accordingly, the connecting part 358 is detachably attached to the support part 356 so that the tubular body 355 of the tubular member 354 is located inside the passage portion 320. The support part 356 and the connecting part 358 are engaged with an engaging structure such as a thread coupling.

The tubular body 310 and the passage portion 320 are configured such that the outer passage 332 starts at the condensate inlet 302 of the second portion 350. The tubular member 354 is configured such that the core passage 334a ends at the condensate outlet 304 on the second portion 350. Holes 322 are formed at the end portion of the passage portion 320 on the open end side so as to connect the outer passage 332 and the middle passage 334b. Accordingly, the condensate is guided downwardly through the outer passage 332, upwardly through the middle passage 334b, and downwardly through the core passage 334a to the condensate outlet 304. The condensate flows through the outer passage 332, middle passage 334b and the core passage 334a in this order.

The passage portion 320 is supported by the support part 356 of the second portion 350. Specifically, the passage portion 320 is supported so as to be located above the support part 356 when the siphon 300 is attached to the drain collecting part 4. Preferably, the second portion 350 including the support part 356 and the passage portion 320 are integrally formed. Alternatively, the passage portion 320 may be detachably attached to the support part 356 of the second portion 350.

The second portion 350 is configured to be detachably attached to the first portion 340. Specifically, a connecting part 342, which has preferably an inner thread 342a on its internal surface, is arranged at the open end of the first portion 340 as shown in FIG. 6. The support part 356 has an outer thread 356a on its external surface. The inner thread 342a on the connecting part 342 corresponds with the outer thread 358a on the connecting part 358. The second portion 350 is configured to be detachably attached to the first portion 340 by coupling the inner thread 342a on the connecting part 342 and the outer thread 358a on the connecting part 358.

The passage portion 320 can be removed from the tubular body 310 by removing the second portion 350 from the first portion 340 since the passage portion 320 is fixed to the support part 356 of the second portion 350.

The second portion 350 has an operating member 352 to facilitate the attachment of the second portion 350 to or removal of it from the first portion 340. For example, the operating member 352 is another grip different from the grip 314. The operating member 352 is configured to be grasped by a maintenance person when he attaches the second portion 350 to or removes it from the first portion 340.

The operating member 352 is arranged on the ring-shaped rim 357 of the support part 356 which is formed circumferentially and extends radially from the edge of the cylindrical part of the support part 356. The open end of the first portion 340 is brought into contact with the rim 357 when the tubular body 310 is assembled. The operating member 352 is located outside the housing 9 when the tubular body 310 is attached to the drain collecting part 4.

The operating member 352 has a ring shape, for example. The operating member 352 has a greater diameter than the first portion 340. A slip prevention structure 352a is preferably formed on a surface of the operating member 352 as shown in FIG. 7. A groove and/or a projection is an example of the slip prevention structure 352a. A maintenance person can grasp the operating member 352 tightly when he rotates the second portion 350 to attach to or remove from the first portion 340.

Now, the maintenance of the siphon 300 is explained below.

When the maintenance of the siphon 300 such as the cleaning or the replacement of the siphon 300 is necessary, the siphon 300 is removed from the drain collecting part 4 and/or the second portion 350 is removed from the first portion 340.

In a case the siphon 300 is removed from the drain collecting part 4, a maintenance person grasps the grip 314 and rotates the tubular body 310 of the siphon 300 for releasing coupling between the thread on the attaching part 312 and the thread on the drain pipe 4a of the drain collecting part 4. After removing the siphon 300 from the drain collecting part 4, the second portion 350 may be removed from the first portion 340, if necessary.

In a case the second portion 350 is removed from the first portion 340, a maintenance person grasps the operating member 352 and rotates the second portion 350 for releasing coupling between the inner thread 342a on the connecting part 342 of the first portion 340 and the outer thread 356a on the support part 356 of the second portion 350. When the second portion 350 is removed from the first portion 340, the passage portion 320 supported by the second portion 350 is removed from the tubular body 310. Further, the tubular member 354 is removed from the support part 356 by disconnecting the connecting part 358 from the support part 356. After removing the second portion 350 from the first portion 340, the first portion 340 may be removed from the drain collecting part 4, if necessary. It is preferable that the first portion 340 is removed from the drain collecting part 4 to fill a liquid in the tubular body 310 as explained in the first embodiment.

Any features in the first and second embodiments can be combined or be replaced with each other in accordance with changes in design, and so on unless such a combination or replacement contrary to each other.

Other Embodiments

Variations of the above mentioned embodiments will be described below. Some or all of the embodiments can be combined with each other unless they are contrary to each other.

(1) In the above embodiment, the heat exchange main unit 10 has an asymmetrical shape, but the shape of the heat exchange main unit 10 is not limited this. The heat exchange main unit according to this invention may be formed in a symmetrical shape as disclosed in WO2009/053248A1 FIGS. 2, 5, 7 for example in which the front and back walls are symmetrically arranged with respect to the direction of the flue gas flow.

(2) In the above embodiment, the siphon 200, 300 is attached to the drain pipe 4a of the drain collecting part 4. Alternatively, the siphon 200, 300 may be connected to the drain collecting part 4 having a pan shape.

(3) In the above embodiment, the attaching part 212, 312 has a cylinder-like shape portion 212a, 312a having an inner thread on its internal surface and the drain pipe 4a of the drain collecting part 4 has a cylinder-like shape portion having an outer thread on its external surface which corresponds to the thread of the attaching part 212, 312. Alternatively, the attaching part 212, 312 may have a cylinder-like shape portion having an outer thread on its external surface and the drain pipe 4a of the drain collecting part 4 may have a cylinder-like shape portion having an inner thread on its internal surface which corresponds to the thread of the attaching part 212, 312.

(4) In the above embodiment, the tubular body 210, 310 of the siphon 200, 300 is attached to the drain collecting part 4 by connecting the thread on the tubular body 210, 310 and the thread on the drain collecting part 4. The connecting may be accomplished by inserting an insertion portion into an insertion hole and holding the insertion portion inserted therein. Such an insertion portion and an insertion hole may be formed on the attaching part 212, 312 and the drain collecting part 4, respectively, or vice versa.

For example, the attaching part of the tubular body may include an insertion portion having a cylinder-like shape. The attaching part may define the condensate inlet of the siphon 200, 300. In other words, the condensate inlet is formed at the center of the insertion portion. The drain collecting part 4 has a circular hole which corresponds to the attaching part and has the corresponding diameter with the attaching part. The insertion portion is held by the hole formed on the drain collecting part 4 during the operation with a holding force such as a friction force and an elastic force.

In addition or alternatively, the attaching part of the tubular body may include pins. The drain collecting part 4 has holes which correspond to the pins and have the corresponding diameter with the pins. The pins are held by the holes formed in the drain collecting part 4 with a holding force such as a friction force and an elastic force.

It is still more preferable that the attaching part is configured to detachably attach the tubular body 210, 310 to the drain collecting part 4 by thread coupling so that the tubular body 210, 310 is securely fixed to the drain collecting part 4 during the operation.

(5) In the above embodiments, the operating member 252, 352 is a grip which is configured to be grasped by a maintenance person for attachment and removal operation. However, the operating member is not limited to this.

For example, the operating member may be a handle which is attached to the second portion 250, 350. The handle is configured to be grasped by a maintenance person when the second portion 250, 350 is attached to or removed from the first portion 240, 340.

Also, the operating member may be one or more clasps which are configured to be operated by a maintenance person for attachment and removal operation. In this case, it is possible to detachably attach the second portion 250, 350 to the first portion 240, 340 with the operating member 252, 352 without the thread 244a, 342a on the first portion 240, 340 and the thread 258a, 356a on the second portion 250, 350.

The present invention is not limited to the above described embodiments, and various variations and modifications may be possible without departing from the scope of the present invention.

The invention claimed is:
1. A heat exchange system comprising:
a heat exchange main unit having a gas channel and a fluid channel configured such that a fluid in the fluid channel can exchange heat with a flue gas in the gas channel in use,
a housing accommodating the heat exchange main unit;
a drain collecting part arranged inside the housing to collect condensate from the flue gas; and
a siphon detachably attached to the drain collecting part to prevent release of the flue gas from a condensate outlet formed therein,
the siphon having a tubular body, a condensate inlet formed on one end side of the tubular body, and the condensate outlet formed on an other end side of the tubular body,
the tubular body having
an attaching part arranged on the end side of the tubular body on which the condensate inlet is formed that is usable to detachably attach the tubular body to the drain collecting part through a hole formed within a wall of the housing, and
a grip arranged on the other end side of the tubular body on which the condensate outlet is formed to be located outside the housing when the tubular body is attached to the drain collecting part.
2. The heat exchange system according to claim 1, wherein
the tubular body is configured such that the tubular body filled with a liquid is attachable to the drain collecting part.

3. The heat exchange system according to claim 1, wherein
the attaching part defines the condensate inlet of the siphon.

4. The heat exchange system according to claim 3, wherein
at least part of the attaching part has a cylinder shape and has a thread, and
at least part of the drain collecting part has a cylinder shape and has a thread corresponding to the thread of the attaching part.

5. The heat exchange system according to claim 3, wherein
the tubular body of the siphon has a cylinder shape.

6. The heat exchange system according to claim 3, wherein
the tubular body further has a contact member which, when the tubular body is attached to the drain collecting part, is located outside the housing and contacts an outside surface of the housing.

7. The heat exchange system according to claim 1, wherein
at least part of the attaching part has a cylinder shape and has a thread, and
at least part of the drain collecting part has a cylinder shape and has a thread corresponding to the thread of the attaching part.

8. The heat exchange system according to claim 7, wherein
the tubular body of the siphon has a cylinder shape.

9. The heat exchange system according to claim 7, wherein
the tubular body further has a contact member which, when the tubular body is attached to the drain collecting part, is located outside the housing and contacts an outside surface of the housing.

10. The heat exchange system according to claim 1, wherein
the tubular body of the siphon has a cylinder shape.

11. The heat exchange system according to claim 10, wherein
the tubular body further has a contact member which, when the tubular body is attached to the drain collecting part, is located outside the housing and contacts an outside surface of the housing.

12. The heat exchange system according to claim 1, wherein
the tubular body further has a contact member which, when the tubular body is attached to the drain collecting part, is located outside the housing and contacts an outside surface of the housing.

13. The heat exchange system according to claim 12, wherein
the contact member is integrally formed on the grip.

14. The heat exchange system according to claim 1, wherein
a slip prevention structure is formed on a surface of the grip.

15. The heat exchange system according to claim 14, wherein
the slip prevention structure includes at least one of a groove and a projection formed on the surface of the grip.

16. The heat exchange system according claim 1, wherein
the siphon further has a passage portion configured to be accommodated in the tubular body, and to be detachably attached to the tubular body.

17. The heat exchange system according to claim 16, wherein
at least one spacer is arranged between an inner surface of the tubular body and an outer surface of the passage portion.

18. The heat exchange system according to claim 16, wherein
the passage portion has a blind-ended tubular shape and forms a condensate passage including an outer passage and an inner passage,
the outer passage is formed between an outer surface of the passage portion and an inner surface of the tubular body, and
the inner passage is formed along the inner surface of the passage portion.

19. The heat exchange system according to claim 18, wherein
the tubular body further has a tubular member configured to be located inside the passage portion and to divide the inner passage into a core passage and a middle passage,
the core passage is formed by the inner surface of the tubular member, and
the middle passage is formed between the outer surface of the tubular member and the inner surface of the passage portion.

20. The heat exchanger system according to claim 19, wherein
the tubular member is configured such that the core passage starts at the condensate inlet formed in the tubular body, and
the tubular body and the passage portion are configured such that the outer passage ends at the condensate outlet formed in the tubular body.

* * * * *